US012050967B2

(12) United States Patent
Calderbank et al.

(10) Patent No.: US 12,050,967 B2
(45) Date of Patent: Jul. 30, 2024

(54) QUANTUM ERROR CORRECTION THAT IS OBLIVIOUS TO COHERENT NOISE

(71) Applicant: DUKE UNIVERSITY, Durham, NC (US)

(72) Inventors: Arthur Robert Calderbank, Durham, NC (US); Jingzhen Hu, Durham, NC (US); Qingzhong Liang, Durham, NC (US)

(73) Assignee: Duke University, Durham, NC (US)

( * ) Notice: Subject to any disclaimer, the term of this patent is extended or adjusted under 35 U.S.C. 154(b) by 179 days.

(21) Appl. No.: 17/673,586

(22) Filed: Feb. 16, 2022

(65) Prior Publication Data

US 2022/0261682 A1 Aug. 18, 2022

Related U.S. Application Data

(60) Provisional application No. 63/149,722, filed on Feb. 16, 2021.

(51) Int. Cl.
*G06N 10/70* (2022.01)
(52) U.S. Cl.
CPC .................................. *G06N 10/70* (2022.01)
(58) Field of Classification Search
None
See application file for complete search history.

(56) References Cited

U.S. PATENT DOCUMENTS

| 6,078,872 | A | * | 6/2000 | Carson | G01R 33/46 324/309 |
|---|---|---|---|---|---|
| 9,663,358 | B1 | * | 5/2017 | Cory | G06F 7/38 |
| 11,663,513 | B2 | * | 5/2023 | Cao | G06N 10/00 706/62 |
| 2019/0026211 | A1 | * | 1/2019 | Wallman | G06F 17/11 |
| 2019/0384597 | A1 | * | 12/2019 | Horesh | G06N 10/00 |
| 2021/0351795 | A1 | * | 11/2021 | Hastings | H03M 13/2906 |
| 2022/0190933 | A1 | * | 6/2022 | Noh | G06N 10/20 |
| 2023/0206110 | A1 | * | 6/2023 | Jiang | H04B 10/70 714/10 |

OTHER PUBLICATIONS

Iverson et al., "Coherence in logical quantum channels", Apr. 23, 2020, California Institute of Technology (Year: 2020).*
Griffiths, "Hilbert Space Quantum Mechanics Is Noncontextual", Oct. 16, 2012, Department of Physics, Carnegie-Mellon University (Year: 2012).*
Brun, "Quantum Error Correction", Oct. 8, 2019, Oxford Research Encyclopedia of Physics, 35 pages, 3 figures (Year: 2019).*
Knill et al., "A Theory of Quantum Error-Correcting Codes", Apr. 26, 1996, American Physical Society, Physical Review Letters, url={http://dx.doi.org/10.1103/PhysRevLett.84.2525}, (Year: 1996).*

* cited by examiner

*Primary Examiner* — Daniel F. McMahon
(74) *Attorney, Agent, or Firm* — Barnes & Thornburg LLP

(57) ABSTRACT

Technologies for addressing coherent noise in a quantum system are disclosed. To passively correct for errors in measurement caused by coherent noise, the quantum system implements an error correction code such that the error correction code effectively reduces the coherent noise to act as an identity operator in a protected subspace of a Hilbert vector space.

20 Claims, 3 Drawing Sheets

QUANTUM ERROR CORRECTION THAT IS OBLIVIOUS TO COHERENT NOISE

CROSS-REFERENCE TO RELATED APPLICATIONS

This application claims the benefit of priority to U.S. Provisional Application No. 63/149,722 filed 16 Feb. 2021, which is incorporated herein by reference in its entirety.

GOVERNMENT LICENSE RIGHTS

This invention was made with government support under CCF-1908730, awarded by the National Science Foundation. The government has certain rights in the invention.

FIELD

The present disclosure generally relates to quantum error correction, and more specifically to generating quantum error correction codes that are oblivious to coherent noise.

BACKGROUND

In quantum computing, quantum bits or qubits, which are analogous to bits representing a "0" and a "1" in a classical (digital) computer, are prepared, manipulated, and measured with near perfect control during a computation process. Imperfect control of qubits leads to errors that can accumulate over the computation process, limiting the size of a quantum computer that can perform reliable computations. One proposed environment for the preparation and manipulation of qubits for large-scale quantum computing applications is a trapped ion structure.

In such a system, a chain of ions (e.g., charged atoms), are trapped and suspended in vacuum by electromagnetic fields. The ions have internal hyperfine states, defined by minute changes in degenerate energy levels of those ions. These minute changes split the degenerate energy levels of the ions and are separated by frequencies in the several GHz range. These frequencies can be used as the computational states of a qubit (referred to as "qubit states"). As a result of their origins based on degenerate energy level, the hyperfine states can be controlled using energy changes prompted by a radiation source such as a laser.

A quantum system is described by a wave function, in which the wave function describes the state of one or more subatomic particles according to the probability of that system existing in any of those states at a time of observation. The laws of quantum mechanics assume a relationship between phases of these differing states, rendering a quantum system "coherent" Like how classical mechanical systems require conservation of energy between bodies of a classically interacting system, quantum systems similarly require conservation of these phase relationships, known as the preservation of coherence. These phase relationships are critical to the preservation of information in quantum computing systems.

Like an isolated classical mechanical system in a frictionless vacuum will maintain perfect conservation of energy, an isolated quantum mechanical system will maintain perfect coherence. However, unlike with a classical system, one cannot investigate a perfectly isolated quantum mechanical system. The act of performing a measurement of the information contained in a quantum mechanical system breaks this state of perfect isolation, resulting in "decoherence," in which the coherence of the quantum mechanical system bleeds to the surrounding environment. In practice, known methods of observing quantum states require some disturbance of the system, leading to decoherence. This decoherence represents a loss of quantum information to the surrounding environment and negatively impacts efficiency of quantum computations. This decoherence is one source of error in quantum measurements, with other sources of error including entanglement between particles, and randomized (stochastic) noise as well as nonrandom (coherent) noise.

The loss of information due to coherent noise can be addressed through active error correction methods. In active methods, a quantum system is organized such that the decoherence process is mathematically reversible. Quantum error correction codes dictate how the quantum information is represented in a state space, such that a series of quantum measurements can actively assess where and what errors in the system are taking place. These quantum error correction codes use qubit operations and measurements to correct quantum states as those qubits are transformed by logical gates, wherein those qubits targeted for correction as they are transformed are referred to as "protected" qubits. By way of example, stabilizer codes append qubits to a given qubit or group of qubits that are to be protected. A unitary encoding circuit then rotates the global state into a subspace of a larger Hilbert space, a vector space where an inner product defines a distance function such that no point, either within the space or at the boundary of the space, is undefined or incomplete. This rotation of the global state into the subspace results in a highly entangled state between qubits that corrects local noise.

SUMMARY

Embodiments presented herein disclose techniques for designing a subspace of a full n-qubit Hilbert space, where this subspace is unperturbed by coherent noise.

One embodiment presented herein discloses a quantum computing system for measuring quantum states oblivious to coherent noise. The system generally includes a quantum circuit having multiple qubits. Each of the qubits has a quantum state. The system also generally includes one or more processors and a memory storing program code. When executed by the one or more processors, the program code causes the quantum computing system to measure the quantum state of the qubits. The quantum computing system constructs a Hilbert vector space representing the measure of the quantum state of the qubits, The quantum computing system generates an error correction code protective of the subspace of the Hilbert vector space from effects of coherent noise, in which the coherent noise acts on the protected subspace as an identity operator. The error correction code is applied.

Another embodiment presented herein discloses a method for measuring quantum states oblivious to coherent noise in a quantum computing system having multiple qubits. The method generally includes measuring a quantum state of one or more of the qubits. The method also generally includes constructing a Hilbert vector space representing the measure of the quantum state of the one or more of the qubits. An error correction code protective of the subspace of the Hilbert vector space from coherent noise is generated. The coherent noise acts on the protected subspace as an identity operator.

Yet another embodiment presented herein discloses a computer-readable storage medium storing instructions. When executed by one or more processors, the instructions cause a quantum computing system having multiple qubits to measure a quantum state of one or more of the qubits. The quantum computing system constructs a Hilbert vector space representing the measure of the quantum state of the one or more of the plurality of qubits. An error correction code protective of the subspace of the Hilbert vector space from coherent noise is generated. The coherent noise acts on the protected subspace as an identity operator.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

A classical computer can apply a corrective operation to quantum computing errors once an error is identified. While active error correction methods have many uses in quantum computing systems, utilizing subspaces of the quantum computing system free of decoherence to passively mitigate accumulating coherent noise can be more efficient.

To address this, embodiments presented herein disclose techniques for designing a subspace of a full n-qubit Hilbert space, where this subspace is unperturbed by coherent noise. In this approach and as further described herein, a quantum computer is represented by an immense Hilbert space, and in at least some embodiments, that space has a dimension of $2^n$, where n represents the number of qubits in the overall quantum system. In an example embodiment, computations performed on quantum computer (e.g., an ion trap quantum computing system) of the $2^n$ system are performed in a target subspace, this subspace having a dimension of $2^m$, where m is a subset of n. In such embodiments, this subspace is protected. When errors take hold in the $2^n$ system, those errors have an effect on the $2^m$ subspace, such that the subspace is relocated within the larger Hilbert space.

Note, the present disclosure uses a trapped ion quantum computer as a reference example for generating quantum error correcting codes that are oblivious to coherent noise. However, one of skill in the art will recognize that in addition to trapped ion quantum computers, the embodiments may be adapted to other types of quantum computing systems, such as quantum annealing systems, superconducting quantum computers, spin qubit quantum computers, and so on.

Figure 1:
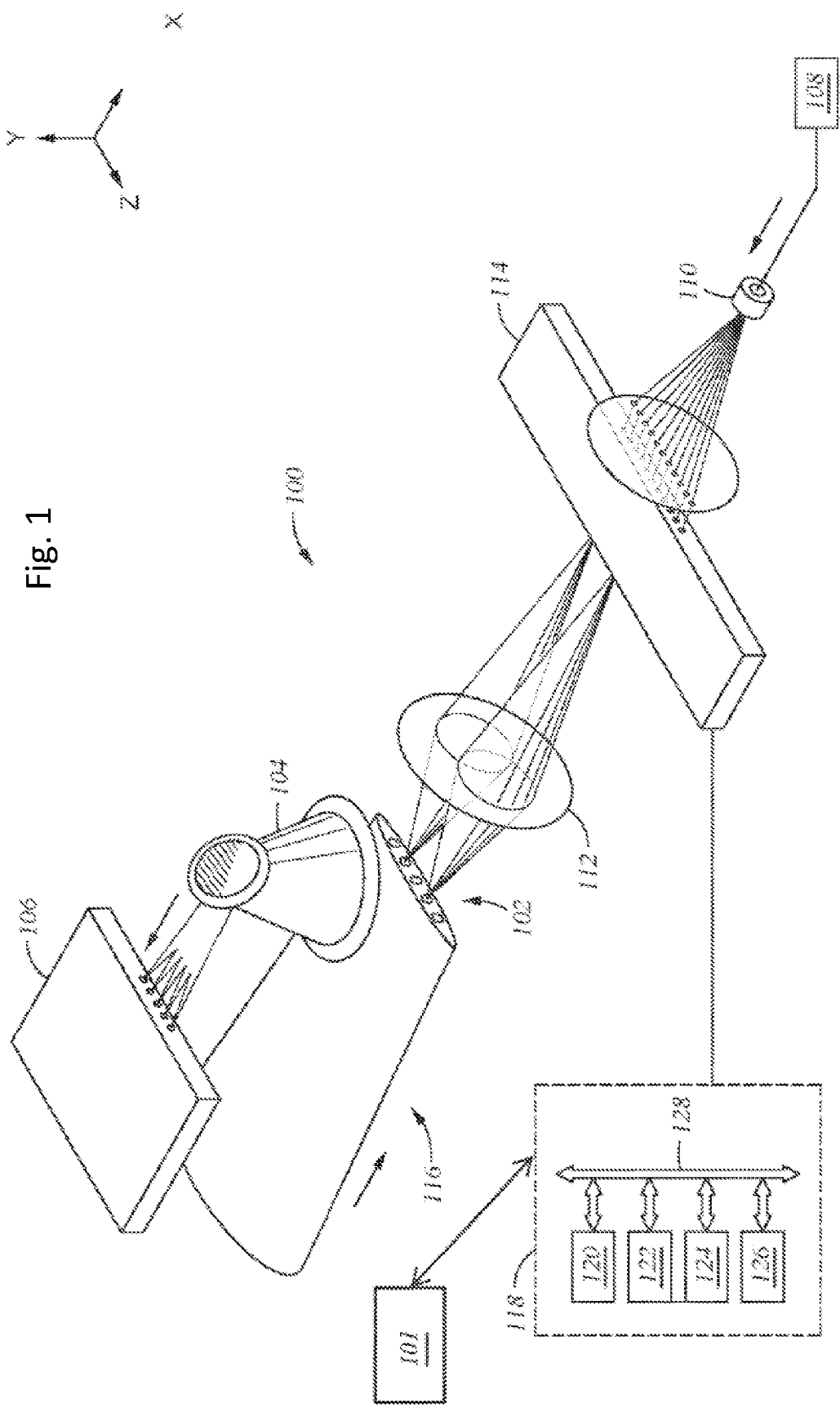
FIG. 1 is a partial view of an example ion trap quantum computer configured to generate quantum error correction codes oblivious to coherent noise, according to an embodiment.

FIG. 1 is a partial view of an example ion trap quantum computer, or system 100, that may implement the techniques described herein, according to one embodiment. The system 100 includes a classical (digital) computer 101, a system controller 118 and a quantum register that is a chain 102 of trapped ions (i.e., five shown) that extend along the Z-axis.

The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106, or other photon collection device, for measurement of individual ions. Non-copropagating Raman laser beams from a laser assembly 108 (also referred to as a "laser"), which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates all ions at once. The system controller (also referred to as a "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128. The RF controller 118 executes a control program which is stored in the ROM 122 or the storage unit 126 and uses the RAM 124 as a working area.

The control program will include software applications that include program code that may be executed by processor in order to perform various functionalities associated with receiving and analyzing data and controlling any and all aspects of the methods and hardware used to create the ion trap quantum computer system 100 discussed herein.

Figure 2:
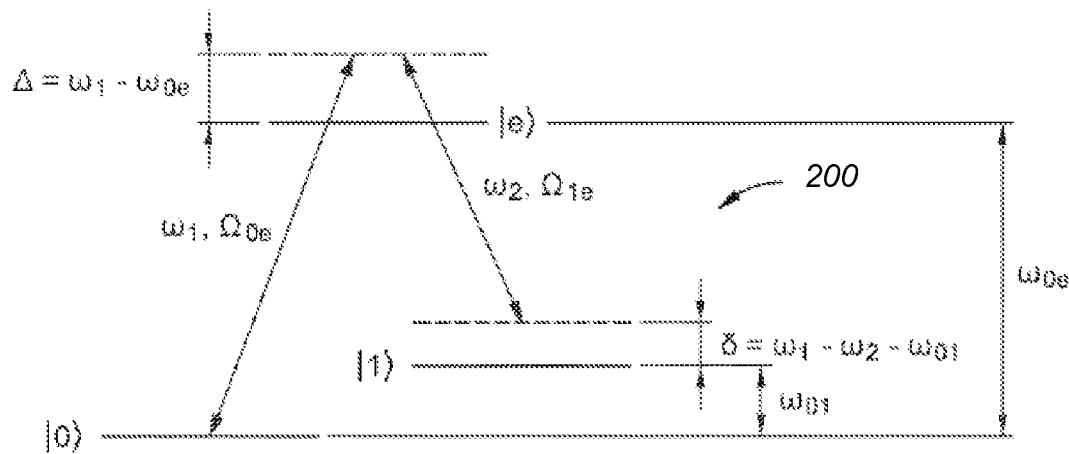
FIG. 2 depicts a schematic energy diagram of each ion in a chain of trapped ions according to one embodiment.

FIG. 2 depicts a schematic energy diagram 200 of each ion in the chain 102 of trapped ions according to one embodiment. In one example, each ion may be a positive Ytterbium ion, $^{171}Yb^+$, which has the $^2S_{1/2}$ hyperfine states (i.e., two electronic states) with an energy split corresponding to a frequency difference (referred to as a "carrier frequency") of $\omega_{01}/2\pi=12.642821$ GHz. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_p$ for any motional mode p with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_p$ with the subscript p denotes the motional ground state for a motional mode p of a chain 102 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 2, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 2. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency 4 is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which has stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions (Be+, Ca+, Sr+, Mg+, and Ba+) or transition metal ions (Zn+, Hg+, Cd+).

In at least some embodiments of a physical quantum computer, such as the system 100, the wave functions of trapped ions can suffer from two main sources of error or noise. One source is stochastic noise, which occurs randomly. Due to the random nature of stochastic noise, these errors do not accumulate with any snowballing effect across any given direction. Unlike in instances of randomized stochastic noise, coherent noise in other or the same embodiments can accumulate throughout the system 100 over time. In at least some embodiments, these errors scale with the square root of an averaged error rate, which leads to a coherent noise effect that increases at a faster rate than a stochastic counterpart. As coherent errors can accumulate along a given direction, these errors are more damaging over time to a quantum computing system.

Figure 3:
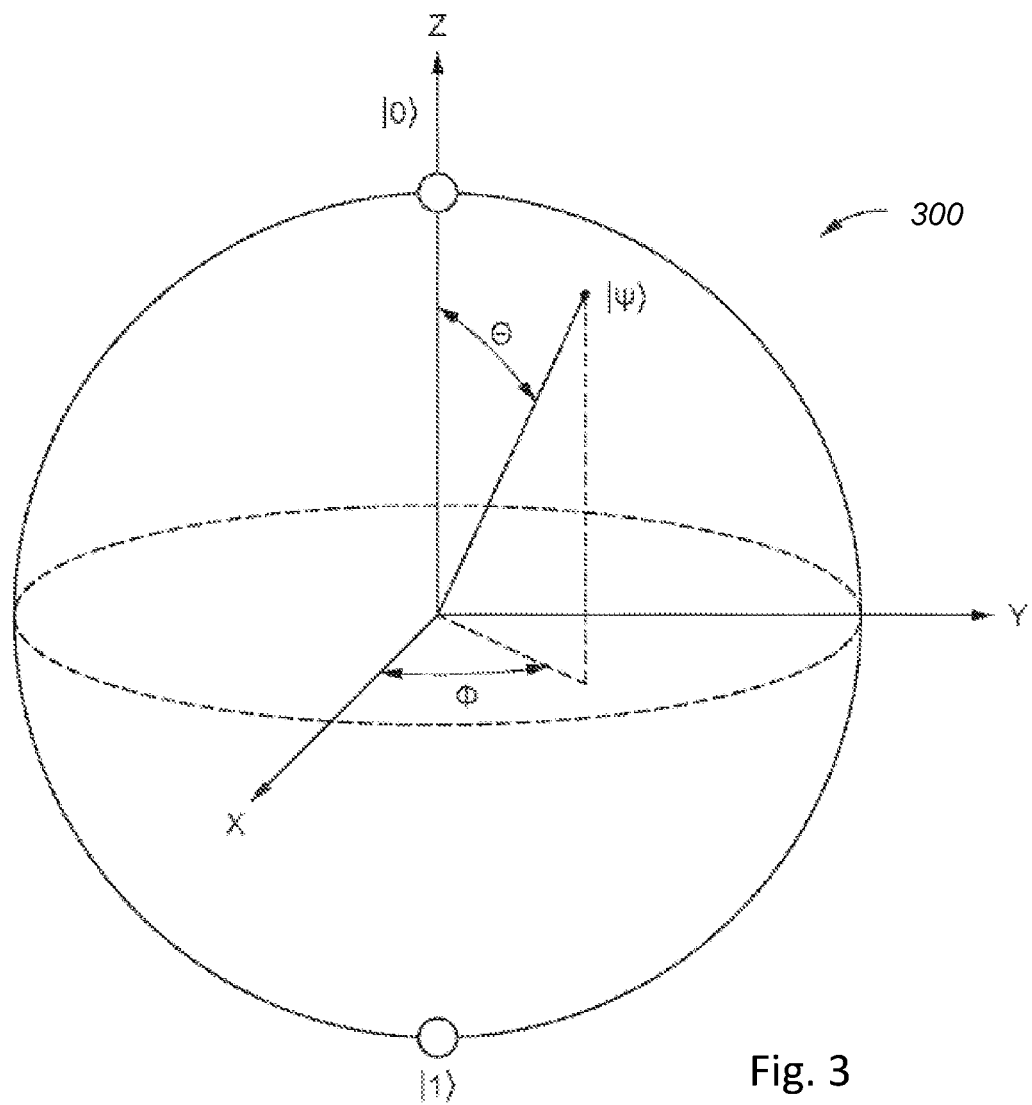
FIG. 3 depicts a qubit state of an ion represented as a point on a surface of the Bloch sphere.

To assist with visualizing the calculations disclosed herein and depicted further in the appendix, FIG. 3 shows a Bloch sphere 300 visualizing the qubit state of a trapped ion.

Information in a classical computing system is organized in a series of binary bits, represented by values of 0 and 1, or the "off" and "on" positions of a switch. In at least some advantageous embodiments of a quantum computing system, the system uses a comparable basic unit of information to its classical counterpart, referred to as the quantum bit or "qubit".

The primary difference between these binary bits and qubits illustrates one of the more common examples of unusual quantum phenomena related to measurement, often known as the "Schrödinger's cat" example, where the random nature of a quantum event results in two mutually exclusive events existing simultaneously until the object of those events is observed. This phenomenon is known as quantum superposition, which illustrates a primary difference between the classical, binary bit, and the qubit. A classical binary bit exists as either 0 or 1. A quantum qubit can exist as a coherent superposition of 0 and 1. While a classical bit can only hold a single unit of Shannon information, a qubit can according hold two such units.

As stated above, the loss of information due to coherent noise can be addressed through active error correction methods. Quantum error correcting codes dictate how the quantum information is represented in a state space, such that a series of quantum measurements can actively assess where and what errors in the system are taking place. These quantum error correction codes use qubit operations and measurements to correct quantum states as those qubits are transformed by logical gates, wherein those qubits targeted for correction as they are transformed are referred to as "protected" qubits. By way of example, stabilizer codes append qubits to a given qubit or group of qubits that are to be protected. A unitary encoding circuit then rotates the global state into a subspace of a larger Hilbert space, a vector space where an inner product defines a distance function such that no point, either within the space or at the boundary of the space, is undefined or incomplete. This rotation of the global state into the subspace results in a highly entangled state between qubits that corrects local noise. A Calderbank-Shor-Steane (CSS) code is a type of stabilizer code constructed from a pair of classical binary error correcting codes.

In an embodiment, the system 100 models coherent errors as rotations about a particular axis, accumulating across time to amplify noise effects. Accordingly, these errors operate as a rotation (in this case in the Z direction) of an impacted qubit by an angle $\theta$. These coherent errors result in an accelerated decoherence of a quantum system, resulting in an accelerating loss of information.

As stated, in an embodiment the system 100 may implement a subspace of a full n-qubit Hilbert space, in which the subspace is unperturbed by coherent noise. In this approach, the system 100 is represented by an immense Hilbert space, and in at least some embodiments that space has a dimension of $2^n$, where n represents the number of qubits in the overall quantum system. In an exemplary embodiment, computations performed on a trapped ion quantum computer of the $2^n$ system are performed in a target subspace, this subspace having a dimension of $2^m$, where m is a subset of n. In such embodiments, this subspace is protected. When errors take hold in the $2^n$ system, those errors have an effect on the $2^m$ subspace, such that the subspace is relocated within the larger Hilbert space.

In an embodiment, a user operates the system 100 by making a first measurement. In the type of error correction associated most often with CSS codes and similar error correction techniques, the user seeks to make such measurements in a way that the measurement carries no information regarding which vector within the Hilbert space is being measured; as such, the measurement must yield the same result for every vector within the subspace. By viewing these measurements in aggregate, the system 100 can perform a reversing technique, whereby the system 100 assesses which error is most likely to have resulted in the translation of the subspace and then reverses that error before returning to the other calculations of the quantum computer. As such, the measurement process is tailored to the noise model, such that the products of such measurements tell the system where the subspace has moved to, and what is the most probable way the subspace translated within the larger vector space.

When a noise model acts on a vector space in the system 100, that noise model effectively induces an operator to act on that space. When noise, coherent or otherwise, acts on the $2^n$ system, the noise inherently induces some operational change in the $2^m$ subsystem. By manipulating the Hamiltonian energy operator of the $2^n$ system, a quantum computing system can impact which operator the noise induces on the $2^m$ subsystem. In a preferred embodiment, this manipulation of the Hamiltonian results in the noise operator acting on the $2^m$ subsystem such that the noise operator protects the $2^m$ subsystem by acting as the identity operator. This identity operation results in the $2^m$ subsystem being effectively undisturbed by the noise acting on the $2^n$ system, since the returned values of the $2^m$ subsystem are identical to the input arguments prior to the action of the noise operator.

In some embodiments, the code space of the system 100 is preserved by a transversal Z-rotation on the basis states of a CSS code, having both necessary and sufficient conditions for achieving the protection of the $2^m$ subsystem based upon the action of the transversal Z-rotation on a stabilizer group that determines the code. According to some embodiments, a CSS code that is oblivious to coherent noise is a constant excitation code, where logical qubits are encoded as a code state that is a sum of physical states indexed by binary vectors with the same weight. In other or the same embodiments, wherein the code is error detecting, then the (constant) weights in different cosets of the X-stabilizers are identical.

In at least some embodiments of the present disclosure, the coherent noise preserves a code space, and acts as the identity operator on the protected subspace. In an embodiment, the system 100 is subject to an [[n, k, d]] stabilizer code, defined by length n, dimension k, and minimum distance d. In such embodiments, the system 100 operates as a Hilbert space of dimension $2^k$. In at least some of such embodiments, a protected space is dimensioned $2^{n-k}$, wherein the stabilizer code represents the subspace of the broader Hilbert space that is fixed by n-k generators. In some embodiments, the stabilizer code is defined by a stabilizer group S, in which stabilizer groups define codes through generator matrices.

In at least some embodiments, stabilizer group S contains subgroup $S_z$, and in some embodiments $S_z$: $=\{\epsilon_j E(a_j, b_j) \in S | a_j = 0\} = <v_i E(0, d_i) | i=1, \ldots, l> \subset S$. In some embodiments, a single-parity check code [M, M-1] consisting of even-weight vectors of length M is given by W, and this check code has a dimension of M-1. In some embodiments, the z stabilizer subgroups have a block structure, wherein the z stabilizers and the associated x stabilizers are divisible by M, and represent a diagonal matrix wherein the 1 values of the identity matrix are replaced with W. In some of such embodiments, the stabilizer group S': $=\{\epsilon_{j,w} E(a_j \otimes 1_M, (b_j \otimes e_1) \otimes \omega) | \epsilon_j E(a_j, b_j) \in S\}$ where $\omega \in \otimes W$ and $i=1 \ldots n$. In such embodiments, the corresponding generator matrix is given by:

$$G_{S'} = \begin{bmatrix} \underline{0}_{nM}^{nM} & \omega_k^{nM} \\ \underline{0}_{nM} & d_i \otimes e_1 \\ c_i \otimes 1_M & d_i \otimes e_1 \end{bmatrix} \begin{matrix} k = 1, \ldots, n(M-1) \\ i = 1, \ldots, l \\ i = l+1, \ldots, r \end{matrix}$$

In some embodiments, a generator matrix is used to define a stabilizer code, wherein the generators are given as tensor products, such as the embodiment described above. In the present embodiment, a stabilizer code V(S') that is oblivious to coherent noise restricts the signs of $v'_i$ and $v_\omega$ within the range of $i=1, \ldots, l$ and $k=1, \ldots, n(M-1)$. In at least some of such embodiments, this defines a new stabilizer code V(S') of the form [[nM, k, d']] where d' is great than the distance of the original stabilizer code d.

In some embodiments, a stabilizer group is given by $S':=\langle v'_i E(c_i \otimes 1_M, d_i \otimes e_1), v_{\omega k} E(0,\omega_k) | i=1, \ldots, r$ and $k=1, \ldots, n(M-1)\rangle$ where $1_M$ denotes an all-ones vector having length M. In such embodiments, $M \geq 2$, M is even, and W represents the [M, M-1] single parity check code for an [[n, k, d]] stabilizer code within stabilizer group S where $d' \geq d$, such that stabilizer code V(S') has distance d' where $d \leq d' \leq Md$.

In some embodiments, the employed quantum error correction code is a CSS code induced from two classical codes $A \subset B$ having a length t. When using an error correcting code, a system 100 must send more bits of information through an information space than the minimum number of bits the quantum computer wishes to communicate. The ratio of the number of bits to be communicated to the number of bits sent is referred to as a code rate, and A and B have respective code rates of and $R_1$ and $R_2$. In some of such embodiments, X-stabilizers are selected as A while Z-stabilizers are selected as $B^\perp$ to construct a [[t, $(R_2 - R_1)$t, $d \geq \min(d_{min}(B), d_{min}(A^\perp))$]] CSS code. In such embodiments, $M \geq 2$, M is even, and W represents the [M, M-1] code consisting of all vectors of even weights. In such embodiments, the X-stabilizers are defined as $C_2 = A \otimes 1_M$ while the Z-stabilizers are defined as $$C_1^\perp = \left\{ b \otimes e_1 + \omega \,\middle|\, \omega \in \bigoplus_{i=1}^t W \text{ and } b \in B^\perp \right\},$$

ensuring that $C_1^\perp$ includes the direct sum of t single-parity-check codes W. In at least some of such embodiments, this construction constrains the signs of the Z-stabilizers to $\epsilon_z = \pi_{i=1}^t \epsilon_{zi}$, while the signs of the X-stabilizers are unconstrained. In at least some of such embodiments, y in each component chosen to satisfy $$\omega_H(y) = \frac{M}{2} \text{ and } \epsilon_{zi} = (-1)^{z_i y^T}.$$

In such embodiments, the CSS codes [[tM, $(R_2-R_1)$t, d=min $(d_{min}(A_1), d_{min}(A_2^\perp)M)$]] are oblivious to coherent noise.

In other embodiments, $A_2 \subset A_1$ are two classical codes of length t, having rates of $R_2$ and $R_1$ respectively. These classical codes can be used to construct a [[t, $(R_2-R_1)$t, d=min $(d_{min}(A_1), d_{min}(A_2^\perp))$]] CSS code where X-stabilizers are selected from $A_2$ while Z-stabilizers are selected from $A_1^\perp$. In such embodiments, M≥2, M is even, and W represents the [M, M-1] code consisting of all vectors of even weights of length M. The X-stabilizers $C_2=A_2 \otimes \underline{1}_M$ and Z-stabilizers $$C_1^\perp = \left\{ (b \otimes e_1) \oplus \omega \,\middle|\, \omega \in \bigoplus_{i=1}^{t} W \text{ and } b \in A^\perp \right\},$$

where $C_1^\perp$ again includes the direct sum of t single-parity-check codes W. In this embodiment, the CSS code oblivious to coherent noise is constructed as [[tM, $(R_2-R_1)$t, ≥min $(d_{min}(A_1)M, d_{min}(A_2^\perp))$]].

Given an [[n, k, d]] stabilizer code, a generator matrix can be defined by:

$$G = \begin{bmatrix} \overset{n}{A} & \overset{n}{B} \\ & C \end{bmatrix} \begin{matrix} r-l \\ l \end{matrix}$$

In at least some embodiments, r=n-k, and the matrix C is selected as the generator matrix of a space $\mathcal{Z} \in \mathbb{F}_2^n | \epsilon_z$ E(0, $\mathcal{Z}$ )∈ S can be defined by the generators of the stabilizer code, and in particular using the generator matrix given by:

$$G_{S'} = \begin{bmatrix} \overset{nM}{A \otimes \underline{1}_M} & \overset{nM}{B \otimes e_1} \\ & C \otimes e_1 \\ & I_n \otimes W \end{bmatrix} \begin{matrix} r-l \\ l \\ n(M-1) \end{matrix}$$

where the (M-1)×M matrix W generates the single-parity check code, and the signs of the n(M-1) stabilizers are generated by $I_n \otimes W$, rendering a generated stabilizer code oblivious to coherent noise. In such embodiments, the minimum distance d' of the stabilizer code generated by $G_{s'}$, is d≤d'≤Md. In a preferred embodiment, the generator matrix $G_{s'}$, when applied to any given [[n, k, d]] stabilizer code, will yield a [[Mn, k, d']] stabilizer code that is oblivious to coherent noise, where distance d≤d'≤Md, and length M≥2 is even.

In other or the same embodiments, extra physical qubits may be introduced to the system by adding 0's to the X-stabilizers, and addition weight 1 Z-stabilizers to the extra qubits. In such embodiments, doing so reduces the rate but provides additional available codes for constructing logic gates. In such embodiments derived from a [[n, k, d]] stabilizer code, a stabilizer code oblivious to coherent noise operates as [[Mn+s, k, d']], where distance d≤d'≤Md, length M≥2 is even, and s≥0, where s represents the number of extra physical qubits added to the system 100.

Figure 4:
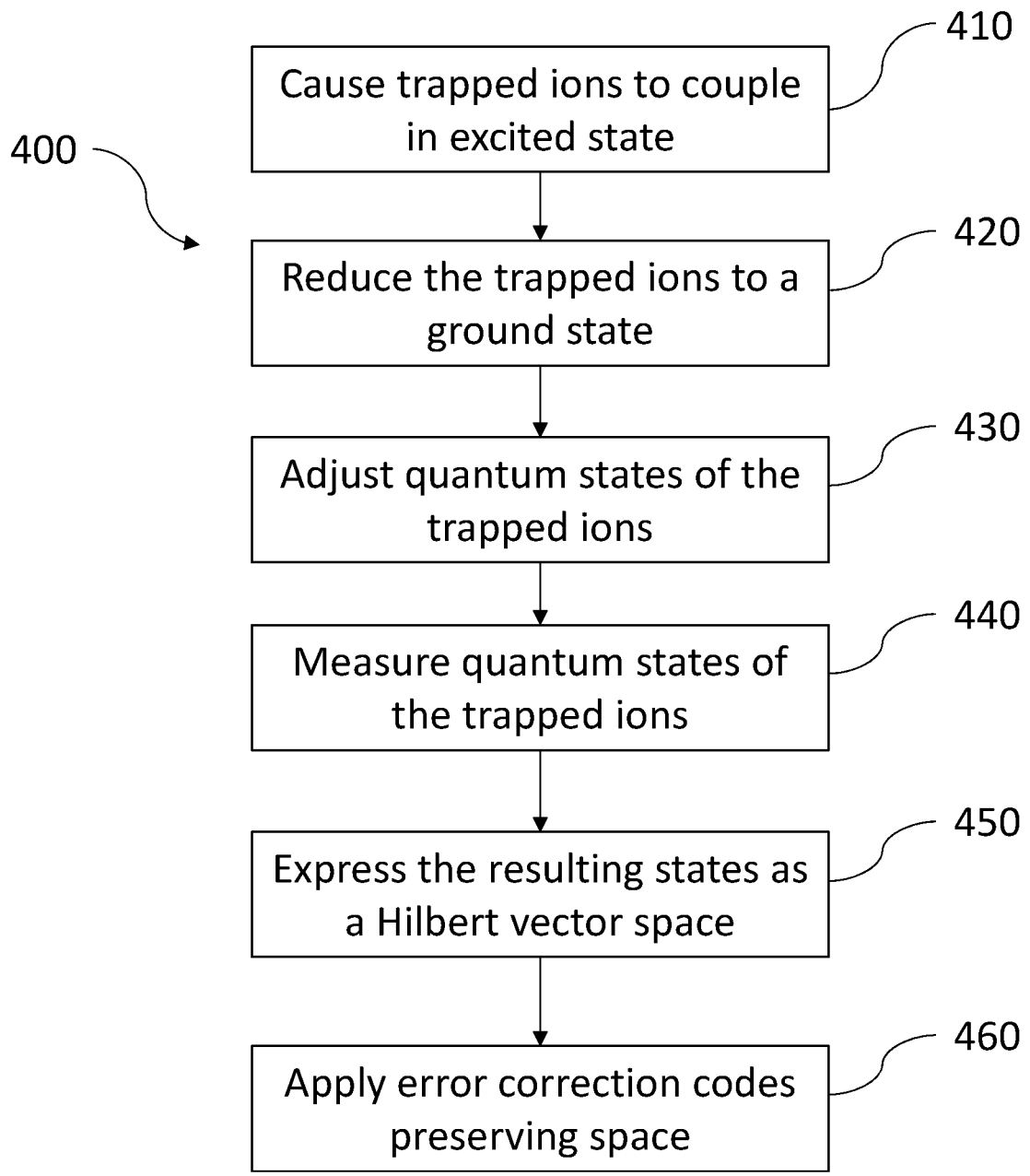
FIG. 4 depicts a flowchart representing an excitation, measurement, and error correcting process according to one embodiment.

Referring now to FIG. 4, the system 100 implements a method 400 for measurement and error correction. At block 410, trapped ion qubits are coupling in an initial excited state, which is reduced to a decayed ground state at block 420. In some embodiments, this decay occurs through the process of optical pumping. At block 430, a laser inducing a single state of a trapped ion excites that ion, which is followed by a quantum measurement stage at block 440. Once the measurement is taken at block 440, these measurements are accumulated, and the resultant is expressed as a Hilbert space at block 450. Error correction codes oblivious to coherent noise are applied at block 460, resulting in protected areas of the Hilbert space immune to the impacts of coherent noise.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

The invention claimed is:

1. A quantum computing system for measuring quantum states, the quantum computing system comprising:
    a quantum circuit having a plurality of qubits, each of the qubits having a quantum state;
    one or more processors; and
    a memory storing program code, which, when executed by the one or more processors, causes the quantum computing system to:
    measure the quantum state of one or more of the plurality of qubits,
    construct a Hilbert vector space representing the measure of the quantum state of the qubits,
    generate an error correction code based on the Hilbert vector space to correct effects of coherent noise acting on the subspace as an identity operator, and
    apply the error correction code to the one or more of the plurality of qubits.

2. The quantum computing system of claim 1, wherein the error correction code is a Calderbank-Shor-Steane (CSS) code.

3. The quantum computing system of claim 1, wherein the error correction code is a [[n, k, d]] stabilizer code.

4. The quantum computing system of claim 3, wherein a generator of the [[n, k, d]] stabilizer code is given by $$G_{S'} = \begin{bmatrix} \overset{nM}{A \otimes 1_M} & \overset{nM}{B \otimes e_1} \\ & C \otimes e_1 \\ & I_n \otimes W \end{bmatrix} \begin{matrix} r-l \\ l \\ n(M-1) \end{matrix}$$

5. The quantum computing system of claim 4, wherein the [[n, k, d]] stabilizer code is of the form [[Mn, k, d']], where distance d≤d'≤Md, and length M≥2 is even.

6. The quantum computing system of claim 4, wherein the [[n, k, d]] stabilizer code is of the form [[Mn+s, k, d']], where distance d≤d'≤Md, length M≥2 is even, and s≥0.

7. The quantum computing system of claim 1, wherein each of the qubits is in a ground state, and further comprising a laser assembly configured to emit a beam to adjust the quantum state of one or more of the plurality of qubits.

8. The quantum computing system of claim 1, further comprising a photon collection device to measure the quantum state of one or more of the plurality of qubits.

9. The quantum computing system of claim 1, wherein the quantum computing system is an ion trap computing system.

10. The method of claim 9, wherein the error correction code is a [[n, k, d]] stabilizer code.

11. The method of claim 10, wherein a generator of the [[n, k, d]] stabilizer code is given by $$G_{S'} = \begin{bmatrix} \overset{nM}{A \otimes 1_M} & \overset{nM}{B \otimes e_1} \\ & C \otimes e_1 \\ & I_n \otimes W \end{bmatrix} \begin{matrix} r-l \\ l \\ n(M-1) \end{matrix}$$

12. The method of claim 11, wherein the stabilizer code is of the form [[Mn, k, d']], where distance d≤d'≤Md, and length M≥2 is even.

13. The method of claim 11, wherein the stabilizer code is of the form [[Mn+s, k, d']], where distance d≤d'≤Md, length M≥2 is even, and s≥0.

14. A non-transitory computer-readable storage medium storing instructions, which, when executed on one or more processors, causes a quantum computing system having a plurality of qubits to:
    measure a quantum state of one or more of the plurality of qubits;
    construct a Hilbert vector space representing the measure of the quantum state of the qubits;
    generate an error correction code based on the Hilbert vector space to correct effects of coherent noise acting on the protected subspace as an identity operator; and
    apply the error correction code to the one or more of the plurality of qubits.

15. The non-transitory computer-readable storage medium of claim 14, wherein the error correction code is a CSS code.

16. The non-transitory computer-readable storage medium of claim 14, wherein the error correction code is a [[n, k, d]] stabilizer code.

17. The non-transitory computer-readable storage medium of claim 16, wherein a generator of the [[n, k, d]] stabilizer code is given by $$G_{S'} = \begin{bmatrix} \overset{nM}{A \otimes 1_M} & \overset{nM}{B \otimes e_1} \\ & C \otimes e_1 \\ & I_n \otimes W \end{bmatrix} \begin{matrix} r-l \\ l \\ n(M-1) \end{matrix}$$

18. The non-transitory computer-readable storage medium of claim 17, wherein the [[n, k, d]] stabilizer code is of the form [[Mn, k, d]], where distance d≤d'≤Md, and length M≥2 is even.

19. The non-transitory computer-readable storage medium of claim 14, wherein the [[n, k, d]] stabilizer code is of the form [[Mn+s, k, d]], where distance d≤d'≤Md, length M≥2 is even, and s≥0.

20. A method for measuring quantum states in a quantum computing system having a plurality of qubits, the method comprising:
    measuring a quantum state of one or more of the plurality of qubits;
    constructing a Hilbert vector space representing the measure of the quantum state of the one or more of the plurality of qubits;
    generating an error correction code based on the Hilbert vector space to correct effects of coherent noise acting on the subspace as an identity operator; and
    applying the error correction code to the one or more of the plurality of qubits.

* * * * *